United States Patent Office 3,152,148
Patented Oct. 6, 1964

3,152,148
PREPARATION OF COMENIC AND PYRO-
MECONIC ACIDS
James P. Easterly, Bay City, and Henry E. Hennis, Midland, Mich., assignors to The Dow Chemical Company, Midland, Mich., a corporation of Delaware
No Drawing. Filed Jan. 3, 1963, Ser. No. 249,126
14 Claims. (Cl. 260—345.7)

This invention relates to a new and advantageous method for making certain hydroxypyranones and it is particularly concerned with the preparation of comenic and pyromeconic acids.

Substituted pyranones such as those mentioned are useful intermediates for compounds having pharmacological value. Comenic acid and pyromeconic acid are hydroxy-4-pyranones of the structures shown.

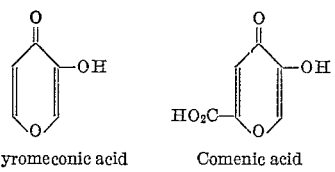

Pyromeconic acid    Comenic acid

These compounds have previously been available only as by-products of opium processing or as the products in very low yields of difficult and complex syntheses.

We have now found that both the above compounds specifically, and similar hydroxypyranones in general, can be obtained in relatively good yields as the products of a straightforward system of synthesis utilizing as a starting material the commercially available kojic acid, this compound being the 5-hydroxymethyl derivative of pyromeconic acid. The system of synthesis is shown schematically by the following diagram, starting with the monoalkyl ether of kojic acid which is made by the alkylation of kojic acid by any of several conventional procedures.

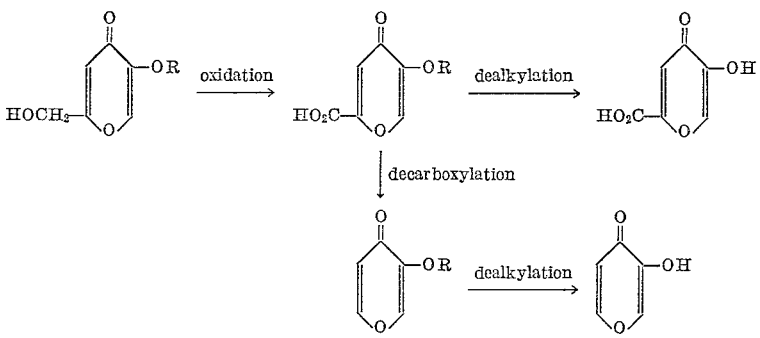

In the above diagram, R represents a lower alkyl hydrocarbon radical. Although general methods for accomplishing all the above steps are broadly known, we have found specific means which are novel in their particular application in each case and which yield unexpectedly superior results when so used. As a result, the combinations of steps shown offer for the first time a practical method whereby each of the two products is obtainable in a commercially acceptable yield.

Referring now to the steps of the overall process in turn, the 5-methyl ether of kojic acid has been oxidized to the corresponding ether of comenic acid in the past by such methods as reaction with potassium permanganate or nitric acid, and oxidation with atmospheric oxygen in the presence of platinum catalyst. The yields of comenic acid methyl ether were uniformly poor, being about 40 percent based on material converted. We have found that by substituting a palladium catalyst for the platinum previously used in the air oxidation, the yield of comenic acid ether is increased to unexpected proportions, thereby converting a laboratory process to one which is commercially feasible. The general conditions for the oxidation are those under which the prior art platinum-catalyzed oxidation was run as described by Heyns et al., Chem. Ber., 87, 13 (1954). For example, the oxidation is carried out in inert solvent suspension, water being the most practical solvent, and the suspension is maintained under approximately neutral or slightly acidic conditions, suitably by appropriate addition to the mixture of a moderately or weakly basic water-soluble compound such as sodium carbonate, potassium bicarbonate or the like. The operable pH range is about 4–8. Under more strongly acidic conditions, the oxidation does not take place, and at higher pH, the pyrone ring becomes unstable and breaks down. A suitable temperature for the reaction is in the range 50°–100° C. Higher or lower temperatures may be employed but are usually not desirable. The proportions of water and of catalyst to the kojic acid ether are those to make convenient reaction conditions. The catalyst is preferably finely divided palladium supported on an inert carrier such as carbon or alumina. For the commonly used 5 percent palladium on carbon, a weight ratio of three or four parts of ether to one part of supported catalyst has been found suitable. Separation of the oxidized product from the aqueous solution obtained is by conventional methods.

Decarboxylation of the comenic acid ether product to the corresponding ether of pyromeconic acid has been found to be easily accomplished merely by heating at about 200°–250° C., preferably at 220°–230° C. Prior art methods for similar reactions include the decarboxylation of both meconic acid and comenic acid to pyromeconic acid by heating in the presence of copper. For example, Garkusha, J. Gen. Chem., U.S.S.R., 16, 2025 (1946), obtained a 48 percent yield of pyromeconic acid by heating equal weights of comenic acid and copper powder. Surprisingly, the use of decarboxylation catalysts such as copper or copper in the presence of quinoline turned out to be disadvantageous in the decarboxylation of alkyl ethers of comenic acid, a very low yield or no yield at all of the desired product being thereby obtained. The decarboxylation is best carried out in inert solvent suspension to avoid excessive decomposition through overheating. Suitable media include diphenyl ether, similar aromatic hydrocarbon ethers, and high-boiling hydrocarbons such as cetane or diphenyl.

Ethers as a class have been cleaved to form an alcohol by heating in contact with a variety of acidic reagents, including acids such as hydrobromic acid, hydriodic acid and sulfuric acid, and acidic salts such as aluminum chloride, zinc chloride, stannic chloride and boron trifluoride. Ordinarily, all of such reagents will work to some extent when applied to a particular ether although one or more may give somewhat better results than the others, depending upon the ether in question. However, in the present case, all but one of the conventional reagents as cited above either fail to produce any ether cleavage or cause the formation of essentially only polymers and tarry materials when they are reacted with ethers of 4-pyranones such as described. In contrast to this behavior, zinc halides alone have been found to be capable of successfully cleaving the ethers of the present case and these reagents give surprisingly good yields of the hydroxypyranone products in so doing, yields of better than 60 percent being obtained. However, the zinc halide reagent is operative only within narrow ranges of reaction conditions and strict control of the reaction is essential to success. The operable temperature range is about 160°–210° C. and best results are obtained at 170°–190° C. No appreciable reaction is obtained below about 160° C. and polymeric and decomposition products are the chief result of operation above 210° C. Also, the molar ratio of zinc halide to pyranone ether is a critical factor, at least about 1.4 moles of halide per mole of ether being necessary to obtain a significant degree of reaction and preferably about 1.8–2.1 moles of halide is employed. Larger quantities of halide give good results but offer no advantage. The reaction is best carried out by heating the powdered halide and ether in intimate mixture. Reaction solvents or diluents have been found to be disadvantageous and produce sharply lowered yields. The common halides, i.e., zinc chloride, zinc bromide and zinc iodide, are equivalent in the reaction. Zinc chloride is preferred for its cheaper price and easier availability.

The following examples are illustrative of the various process steps. The monomethyl ether of kojic acid employed as the starting material in Example 1 was made by reacting dimethyl sulfate with kojic acid according to the procedure of Campbell et al., J. Org. Chem., 15, 221 (1950). In actual operation of either variant of the process, the successive steps utilize the crude reaction product of the preceding step without intermediate purification as shown in the examples. This avoids excessive purification losses without significantly affecting the quality of the end product.

*Example 1*

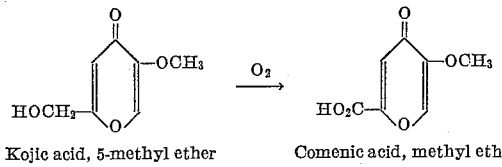

Kojic acid, 5-methyl ether     Comenic acid, methyl ether

A 5-liter reactor flask was equipped with stirrer, reflux condenser and a gas inlet sparging tube extending to about the bottom of the flask. This reactor was charged with 100 g. kojic acid 5-methyl ether, 3 liters of water, and 30 g. of 5 percent by weight palladium on carbon. Air was vigorously sparged into the dispersion at 60°–80° C. for 24 hours, the pH of the mixture being maintained at 5–6 throughout the oxidation by the addition from time to time of dilute aqueous sodium carbonate. The reaction mixture was allowed to cool to about 50° C. and the palladium catalyst was removed by filtration. The light yellow-green filtrate was acidified to pH 1–2 by addition of concentrated hydrochloric acid, causing the precipitation of a white powdery solid. The mixture was maintained at about 5° C. for 24 hours to obtain essentially complete precipitation of the product. The precipitated methyl ether of comenic acid was separated by filtration, washed with cold acetone and dried. The product was a white powder, M.P. 262°–265° C., yield 94 g.

*Example 2*

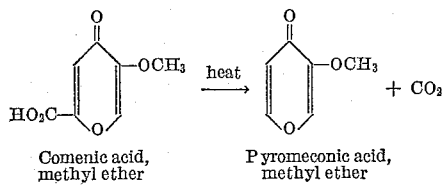

Comenic acid, methyl ether     Pyromeconic acid, methyl ether

A mixture of 86 g. of the methyl ether of comenic acid and 300 ml. of diphenyl ether was put in a reactor flask equipped with stirrer and reflux condenser. The mixture was stirred and heated at 220° C. for 3 hours, at the end of which time there was no further evolution of carbon dioxide. The reaction mixture was cooled to 150° C. and filtered to remove a small amount of undissolved material. Toluene was added to the viscous solution as an aid to filtration. The filtrate was further diluted with petroleum ether (boiling range 60°–100° C.) until it became cloudy and the solution was then cooled. Crude pyromeconic acid methyl ether crystallized from solution. This was collected and recrystallized from a toluene-petroleum ether mixture to yield 54 g. of white crystals, M.P. 91°–93° C.

*Example 3*

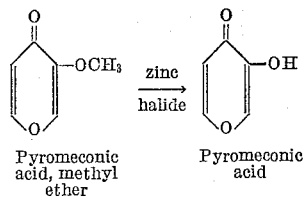

Pyromeconic acid, methyl ether     Pyromeconic acid

An intimate mixture of 25.0 g. of pyromeconic acid methyl ether and 55.7 g. of finely powdered anhydrous zinc chloride was heated at 180°–190° C. for 3 hours in a flask. A solution of 15 ml. of concentrated hydrochloric acid in 300 ml. of water was then added to the solid mass to decompose the zinc chloride complex and the mixture was heated at reflux temperature for 45 minutes. Undissolved solids were separated from the reaction mixture and the filtrate was continuously extracted with chloroform for 30 hours. The chloroform extract was evaporated to dryness to yield 15.7 g. of light brown crude pyromeconic acid, M.P. 114°–118° C. A small amount of polymeric material was present in this product and this was separated by boiling the product in 400 ml. of toluene until only the polymer remained undissolved. The filtered toluene solution was diluted to the cloud point with petroleum ether and cooled to cause crystallization. The crystalline pyromeconic acid thereby obtained amounted to 13.7 g., M.P. 117°–119° C.

*Example 4*

By the procedure of Example 3, 10 g. of pyromeconic acid methyl ether was reacted with 22.3 g. of zinc chloride to obtain as the residue from the chloroform extract 8.4 g. of crude pyromeconic acid. This crude product was sublimed under reduced pressure to obtain 5.1 g. of white crystalline pyromeconic acid, M.P. 116°–118° C.

*Example 5*

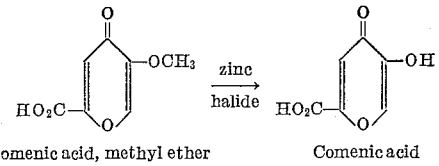

Comenic acid, methyl ether     Comenic acid

An intimate mixture of 5.0 g. of the methyl ether of comenic acid and 10.6 g. of finely powdered zinc chloride was heated in a reaction flask at 170°–180° C. for 3 hours. A solution of 5 ml. of concentrated hydrochloric acid in 100 ml. of water was added to the reaction mass and the resulting solution was cooled, causing the separation of crystalline crude comenic acid. This product was recrystallized from a water solution clarified with charcoal to yield 2.3 g. of white crystals melting at 283° C. with decomposition.

When the procedure of Examples 3, 4 and 5 is repeated using similar molar proportions of zinc bromide or zinc iodide in place of zinc chloride, demethylated products are obtained in yields comparable to those shown above.

Similarly, lower alkyl ethers other than the methyl ethers shown may be employed in the procedures of the above examples with like results. Such ethers include the ethyl, propyl and butyl ethers of the various acids shown.

Examples 6 and 7 show the criticality of reactant ratios and reaction temperature in the dealkylation step. The behavior of pyromeconic acid methyl ether there shown is characteristic of similar hydroxy-4-pyranone ethers such as the methyl ether of comenic acid under the same conditions.

*Example 6*

Mixtures of zinc chloride and pyromeconic acid methyl ether in various molar ratios were heated at about 180° C. as shown in Example 3. The results obtained are shown in the following table.

| Molar Ratio, ZnCl$_2$/Ether | Melting Point, ° C., Crude Product |
|---|---|
| 0.12/1 | 65–85 |
| 1.1/1 | 67–95 |
| 1.6/1 | 100–108 |
| 2.12/1 | 116–120 |

It is seen that little or no reaction was obtained at the two lower ratios, incomplete reaction occurred at a ratio of 1.6/1 and a product of good quality was obtained at the highest ratio shown.

*Example 7*

Mixtures of zinc chloride and pyromeconic acid methyl ether in 2.1/1 molar ratio were heated as in Example 3 but at various temperatures. The results are listed below.

| Temperature, ° C. | Results |
|---|---|
| 150 | Little or no reaction. |
| 185 | Ca. 60 percent yield. |
| 200 | Product contained considerable polymer. |
| 250 | Complete decomposition. |

We claim:

1. A process for making pyromeconic acid which comprises, in combination, the steps of:
   (a) reacting by contacting the 5-(lower alkyl) ether of kojic acid in water suspension at a pH of about 4–8 with an oxygen-containing gas at about 50°–100° C. in the presence of an effective amount of finely divided catalytic palladium, thereby forming the lower alkyl ether of comenic acid,
   (b) heating said lower alkyl ether of comenic acid at 200°–250° C., thereby forming the lower alkyl ether of pyromeconic acid, and
   (c) reacting by contacting said lower alkyl ether of pryomeconic acid with at least about 1.4 molar proportions of zinc halide at about 160°–210° C. for a length of time sufficient for a significant amount of reaction to take place, and separating pyromeconic acid from the reaction mixture thereby obtained.

2. The process of claim 1 wherein the lower alkyl is methyl.

3. The process of claim 1 wherein the zinc halide is ZnCl$_2$.

4. A process for making comenic acid which comprises, in combination, the steps of:
   (a) reacting by contacting a 5-(lower alkyl) ether of kojic acid in water suspension at a pH of about 4–8 with an oxygen-containing gas at about 50°–100° C. in the presence of an effective amount of finely divided palladium, thereby forming the lower alkyl ether of comenic acid, and
   (b) reacting by contacting said lower alkyl ether of comenic acid with at least about 1.4 molar proportions of zinc halide at about 160°–210° C. for a time sufficient for a significant amount of reaction to take place, and separating comenic acid from the reaction mixture thereby obtained.

5. The process of claim 4 wherein the lower alkyl is methyl.

6. The process of claim 4 wherein the zinc halide is ZnCl$_2$.

7. In a process for the oxidation of a 5-(lower alkyl) ether of kojic acid to the corresponding lower alkyl ether of comenic acid which comprises contacting said ether of kojic acid in water suspension at a pH of about 4–8 with an oxygen-containing gas at about 50°–100° C. in the presence of a metallic catalyst, the improvement wherein the metallic catalyst is finely divided palladium.

8. A process which comprises heating a lower alkyl ether of comenic acid at a temperature of about 200°–250° C., thereby forming the corresponding lower alkyl ether of pyromeconic acid.

9. The process of claim 8 wherein the lower alkyl is methyl.

10. The process of claim 8 wherein the comenic acid ether is heated in inert solvent suspension.

11. A process for the preparation of a hydroxy-4-pyranone which comprises reacting by contacting a mole of a lower alkoxy-4-pyranone with at least about 1.4 moles of zinc halide at about 160° C. to about 210° C. for a length of time sufficient for a significant amount of reaction to take place.

12. The process of claim 11 wherein the zinc halide is ZnCl$_2$.

13. The process of claim 12 wherein the lower alkoxy-4-pyranone is the methyl ether of pyromeconic acid.

14. The process of claim 12 wherein the lower alkoxy-4-pyranone is the methyl ether of comenic acid.

No references cited.